United States Patent
Feraud et al.

(10) Patent No.: US 10,443,697 B2
(45) Date of Patent: Oct. 15, 2019

(54) SPEED REDUCTION GEAR COMPRISING TWO INTERMEDIATE TRANSMISSION LINES

(71) Applicant: SAFRAN TRANSMISSION SYSTEMS, Colombes (FR)

(72) Inventors: Benjamin Feraud, Rueil-malmaison (FR); Maxime Amiet, Paris (FR); Guillaume Beck, Chantilly (FR); Samuel Raymond Germain Becquerelle, Montigny-le-bretonneux (FR); Antoine Mathieu, Courbevoie (FR); Boris Morelli, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 415 days.

(21) Appl. No.: 15/514,216

(22) PCT Filed: Sep. 18, 2015

(86) PCT No.: PCT/FR2015/052513
§ 371 (c)(1),
(2) Date: Mar. 24, 2017

(87) PCT Pub. No.: WO2016/051045
PCT Pub. Date: Apr. 7, 2016

(65) Prior Publication Data
US 2017/0321787 A1    Nov. 9, 2017

(30) Foreign Application Priority Data
Sep. 30, 2014   (FR) ..................................... 14 59282

(51) Int. Cl.
*F16H 35/06*    (2006.01)
*F02C 7/36*     (2006.01)
(Continued)

(52) U.S. Cl.
CPC ............. *F16H 35/06* (2013.01); *F01D 15/12* (2013.01); *F01D 25/16* (2013.01); *F01D 25/18* (2013.01);
(Continued)

(58) Field of Classification Search
None
See application file for complete search history.

(56) References Cited

U.S. PATENT DOCUMENTS 2,595,513 A * 5/1952 Cureton .................... F16D 3/20
                                                464/153
3,772,934 A * 11/1973 Warren ..................... F16H 1/22
                                                74/410

(Continued)

FOREIGN PATENT DOCUMENTS

EP         0636813 A1     2/1995
WO    WO-2013150229 A1    10/2013

OTHER PUBLICATIONS

International Search Report with English language translation, dated Feb. 24, 2016 PCT Application No. PCT/FR2015/052513.

*Primary Examiner* — William Kelleher
*Assistant Examiner* — Gregory T Prather
(74) *Attorney, Agent, or Firm* — Womble Bond Dickinson (US) LLP

(57) ABSTRACT

Speed reduction gear comprising two intermediate transmission lines, in particular for a turbine engine, comprising an input line (12) and an output line that is driven by the input line via said intermediate transmission lines, said intermediate transmission lines being substantially parallel, characterized in that said reduction gear comprises means for distributing loads between said intermediate lines, said load distribution means comprising swiveling coupling means (30) for rotatably coupling one end of the input line, and (Continued)

oil-damping means (40, 50) for damping radial movements of an opposite end of the input line.

10 Claims, 3 Drawing Sheets

(51) Int. Cl.
  *F16H 1/22* (2006.01)
  *F02C 7/32* (2006.01)
  *F16H 57/021* (2012.01)
  *F01D 25/18* (2006.01)
  *F01D 15/12* (2006.01)
  *F01D 25/16* (2006.01)
  *F16F 15/16* (2006.01)
  *F16H 1/20* (2006.01)

(52) U.S. Cl.
  CPC .................. *F02C 7/32* (2013.01); *F02C 7/36* (2013.01); *F16F 15/16* (2013.01); *F16H 1/20* (2013.01); *F16H 1/22* (2013.01); *F16H 57/021* (2013.01); *F05D 2220/30* (2013.01); *F05D 2250/312* (2013.01); *F05D 2260/4031* (2013.01); *Y02T 50/671* (2013.01)

(56) References Cited

U.S. PATENT DOCUMENTS

| | | | | |
|---|---|---|---|---|
| 4,312,244 | A * | 1/1982 | Barnes | F16H 1/22 74/410 |
| 4,838,711 | A * | 6/1989 | Munkel | F01D 25/164 384/215 |
| 5,542,311 | A * | 8/1996 | Deeg | F16H 1/22 74/410 |
| 6,264,138 | B1 * | 7/2001 | Hawkins | B64D 35/00 244/60 |
| 6,301,986 | B1 * | 10/2001 | Berky | F16H 1/22 74/410 |
| 2015/0033890 | A1 * | 2/2015 | Pettinotti | F01D 25/164 74/423 |
| 2018/0372197 | A1 * | 12/2018 | Mathieu | F01D 25/16 |

* cited by examiner

SPEED REDUCTION GEAR COMPRISING TWO INTERMEDIATE TRANSMISSION LINES

TECHNICAL FIELD

The present invention relates to a speed reduction gear comprising two intermediate transmission lines, in particular for a turbine engine.

PRIOR ART

The prior art includes in particular the documents U.S. Pat. No. 3,772,934, EP-A1-0 636 813 and WO-A1-2013/150229.

A turbine engine can comprise one or more mechanical speed reduction gears. This is in particular the case in a turboprop engine of which the propeller is rotated by a turbine shaft via a speed reduction gear.

There are numerous types of speed reduction gear, such as reduction gears comprising epicyclic gear trains, chains, worm gears, intermediate transmission lines, etc. The present invention essentially relates to a reduction gear comprising intermediate transmission lines (also referred to as a compound reduction gear).

In the prior art, a speed reduction gear of this kind comprises an input line and an output line that is driven by the input line via two intermediate transmission lines. The power transmitted by the input line is divided between the intermediate lines before being transferred to the output line. The intermediate transmission lines are parallel and generally each comprise a shaft carrying an input gear that meshes with the input line and an output gear that meshes with the output line. By making use of the number of teeth on the different gears, it is possible to achieve a reduction ratio between the input line and the output line. This architecture allows a significant speed reduction in a confined space and having a limited mass.

A reduction gear of this kind is, by definition, a hyperstatic system. When no specific arrangement is provided, it is possible for one intermediate line to transfer most of the engine power, while the other intermediate line transfers virtually no power.

DISCLOSURE OF THE INVENTION

The present invention in particular proposes adding load distribution means to a reduction gear of this kind in order to ensure that half the power passes through each of the intermediate lines of the reduction gear.

The invention proposes a speed reduction gear for a turbine engine, such as a turboprop engine, comprising an input line and an output line that is driven by the input line via said intermediate lines, said intermediate lines being substantially parallel, characterised in that said reduction gear comprises means for distributing loads between said intermediate lines, said load distribution means comprising swiveling coupling means for rotatably coupling one end of the input line, and oil-damping means for damping radial movements of an opposite end of the input line.

According to the invention, the input line is capable of moving radially (relative to its longitudinal axis). This is possible because one of the ends of the input line is mounted so as to be swivelable relative to a drive shaft for example. The opposite end of the input line can thus move in the radial direction, these movements being damped by oil. Said swiveling and damping means form load distribution means that operate in the following manner. If one of the intermediate lines has a greater load, this means that the torque passing through this line is greater than in the other line, and thus the stress caused by this torque on the gear of the input line is greater on one side than on the other. A force is thus applied to the input gear, causing the radial movement of the input line. This movement makes it possible to re-balance the clearances at the input line. When balanced, the stresses on the gear that result from the torques on the intermediate lines cancel each other out, i.e. the torques on the intermediate lines are equal.

The reduction gear according to the invention can comprise one or more of the following features, taken in isolation or in combination with one another:

- the damping means are designed to allow the input line to move in a direction substantially perpendicular to a plane passing substantially through axes of the intermediate lines,
- the input line is rotated by an antifriction bearing, said bearing comprising an outer race that is mounted so as to be radially slidable in a slide and that defines a damping oil chamber together with walls of said slide,
- said race has an annular inner periphery that defines a raceway, and a generally square or rectangular outer periphery, the parallel and opposing lateral edges of which cooperate in a sliding manner with lateral walls of the slide,
- said oil chamber comprises an upper oil cavity delimited between the outer race and an upper wall of the slide, and a lower oil cavity delimited between the outer race and a lower wall of the slide,
- the outer race comprises an outer peripheral groove that provides fluid communication between said upper and lower cavities,
- the outer race has a front annular seal and a rear annular seal which cooperate with front and rear walls, respectively, of said slide,
- the slide is fixed to a housing of the reduction gear,
- the swiveling means and the damping means are mounted on either side of a gear of the input line.

The present invention also relates to a turbine engine which is characterised in that it comprises at least one reduction gear as described above. The reduction gear can comprise an output line designed to drive an unducted propeller of the turbine engine.

The turbine engine is preferably an aircraft turboprop engine.

DESCRIPTION OF THE FIGURES

The invention will be better understood and other details, features and advantages of the invention will emerge from reading the following description given by way of nonlimiting example and with reference to the accompanying drawings, in which.

DETAILED DESCRIPTION

Figure 1:
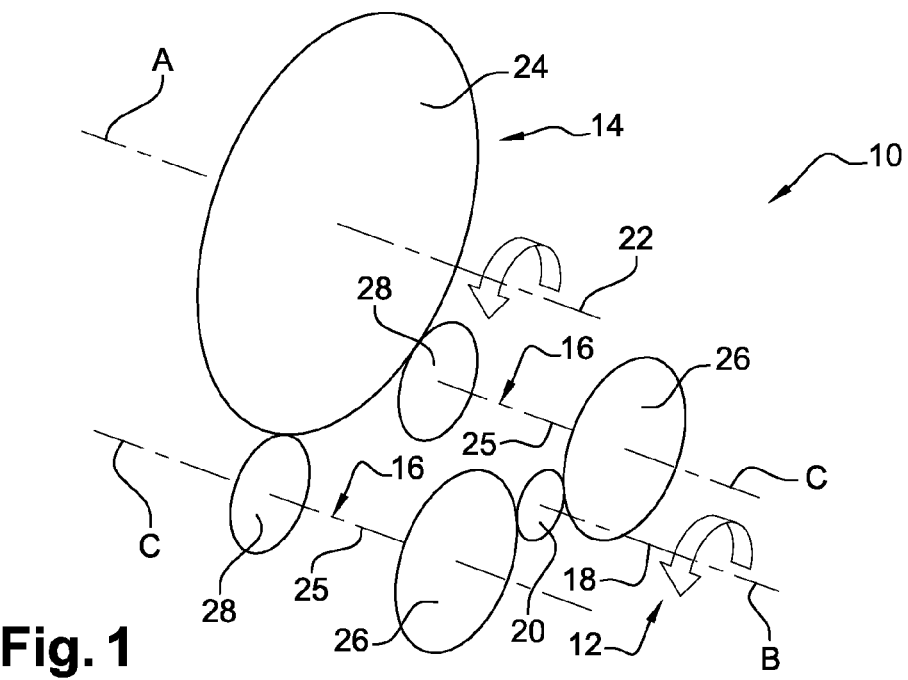
FIG. 1 is a very schematic side view of a speed reduction gear comprising two intermediate transmission lines.

FIG. 1 very schematically shows a speed reduction gear 10 comprising two intermediate transmission lines, said reduction gear 10 essentially comprising four parts: an input line 12, an output line 14, and two intermediate transmission lines 16 that are driven by the input line 12 and in turn drive the output line 14.

The various parts 12, 14, 16 of the reduction gear are generally mounted in a housing (not shown here) of the reduction gear, said housing comprising a first opening for the input line to pass through and be connected to a first member of a turbine engine for example, and a second opening for the output line to pass through and be connected to a second member of the turbine engine. The first member is a turbine shaft of the turbine engine, for example, and the second member is a drive shaft of a propeller of said turbine engine when said turbine engine is a turboprop engine.

The input line 12 comprises a shaft 18 that carries an externally toothed gear 20. The gear 20 and the shaft 18 are coaxial and rotate about the same axis, denoted B.

The output line 14 comprises a shaft 22 that carries an externally toothed gear 24. The gear 24 and the shaft 22 are coaxial and rotate about the same axis, denoted A. In this case, said gear and shaft rotate in the same direction of rotation as the gear 20 and the shaft 18 of the input line.

The input and output lines 12, 14 are parallel. The axes of rotation A, B thereof are therefore parallel.

The intermediate transmission lines 16 are substantially parallel and identical. Each line 16 comprises a shaft 25 that carries an input gear 26 at a first end and an output gear 28 at a second end. The output gears 28 mesh with the gear 24 of the output line 14. The input gears 26 mesh with the gear 20 of the input line 12. The gears 26, 28 are externally toothed gears. Each shaft 25 and the gears 26, 28 thereof are coaxial and rotate about the same axis, denoted C, that is parallel to the axes A and B.

Figure 2:
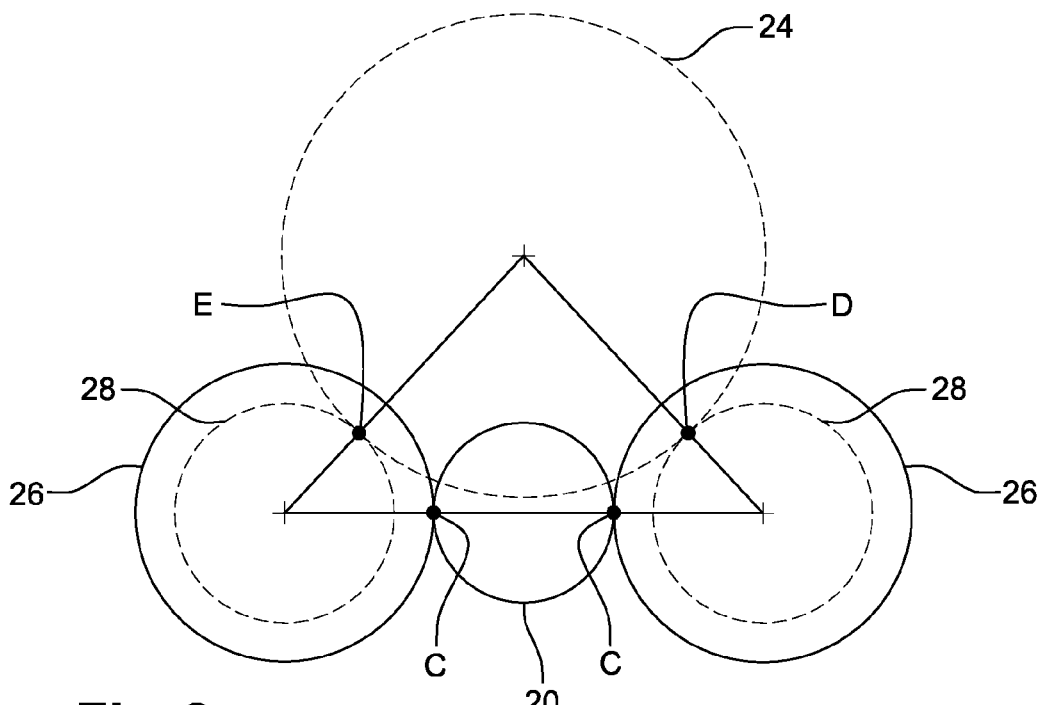
FIG. 2 is a very schematic front view of a speed reduction gear comprising two intermediate transmission lines.

As explained above, this type of reduction gear 10 is a hyperstatic system and it is possible for one intermediate line 16 to transfer most of the engine power, while the other intermediate line transfers virtually no power. As can be seen in FIG. 2, this poor power or load distribution is in particular due to the fact that, although the gears 26 are in contact with the gear 20 at the points C and the gear 28 of one of the intermediate lines is in contact with the gear 24 at point D, it is difficult to ensure that there is no clearance at E between the gear 24 and the gear 28 of the other intermediate line.

The invention proposes a solution to this problem by providing the reduction gear 10 with means for distributing loads between the intermediate lines 16.

The general principle of the invention is shown in FIGS. 3 to 5, and FIGS. 6 and 7 show an embodiment of the invention.

According to the invention, the shaft 18 of the input line 12 is capable of moving radially (relative to its longitudinal axis). This is possible because one of the ends thereof is mounted so as to be swivelable (FIG. 5) relative to the turbine shaft for example. The end of the shaft 18 comprises swivelable splines 30 for example that engage in complementary splines of a sleeve 32 for connecting the input line of the reduction gear to the turbine shaft. In this case, radial movements are intended to mean pivotal movements of the input line 12 about a point located at the swivelable end thereof.

The opposite end of the shaft 18 of the input line 12 can thus move radially, these movements being damped by oil 34.

If one of the intermediate lines 16 has a greater load (FIG. 3), this means that the torque passing through this line is greater than in the other line, and thus the stress f1 caused by this torque on the gear 20 of the input line is greater on one side than on the other. A force F is thus applied to the gear 20 of the input line, causing the radial movement of the input line. This movement makes it possible to re-balance the clearances at the input line. When balanced, the stresses f1, f2 on the gear 20 that result from the torques on the intermediate lines cancel each other out, i.e. the torques on the intermediate lines are equal.

Advantageously, the oil-damping means 34 are associated with an antifriction bearing 36 for guiding the shaft 18 of the input line 12.

Figure 6:
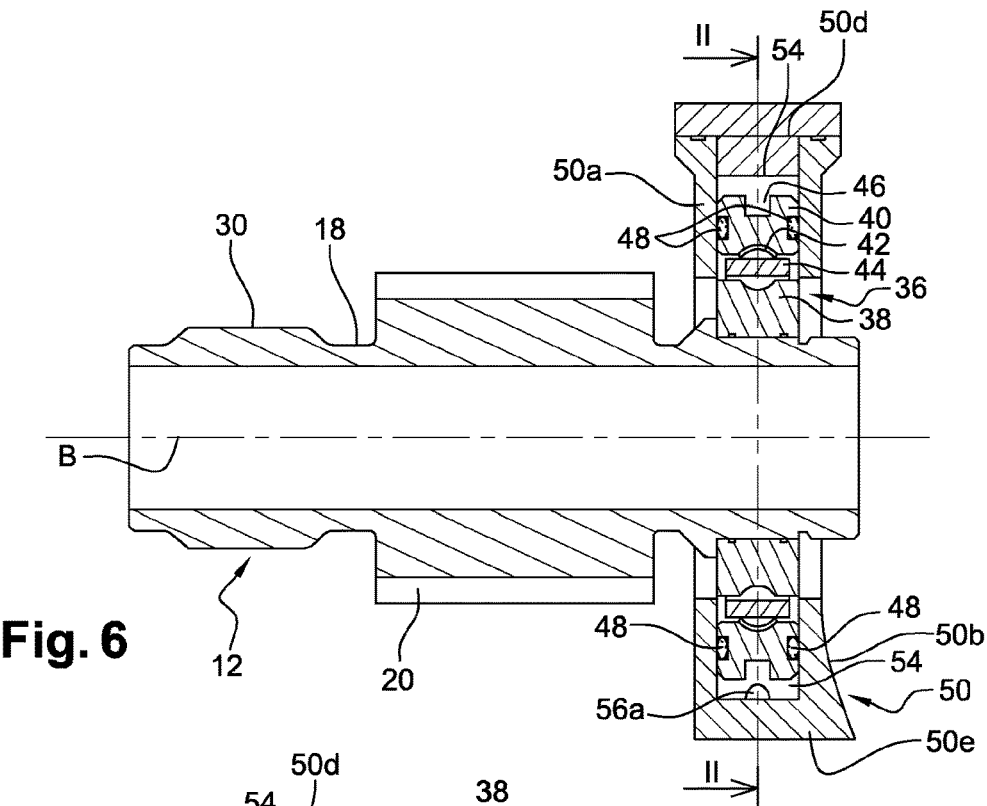
FIG. 6 is a schematic axial sectional view of an input line provided with load distribution means, according to an embodiment of the invention.
Figure 7:
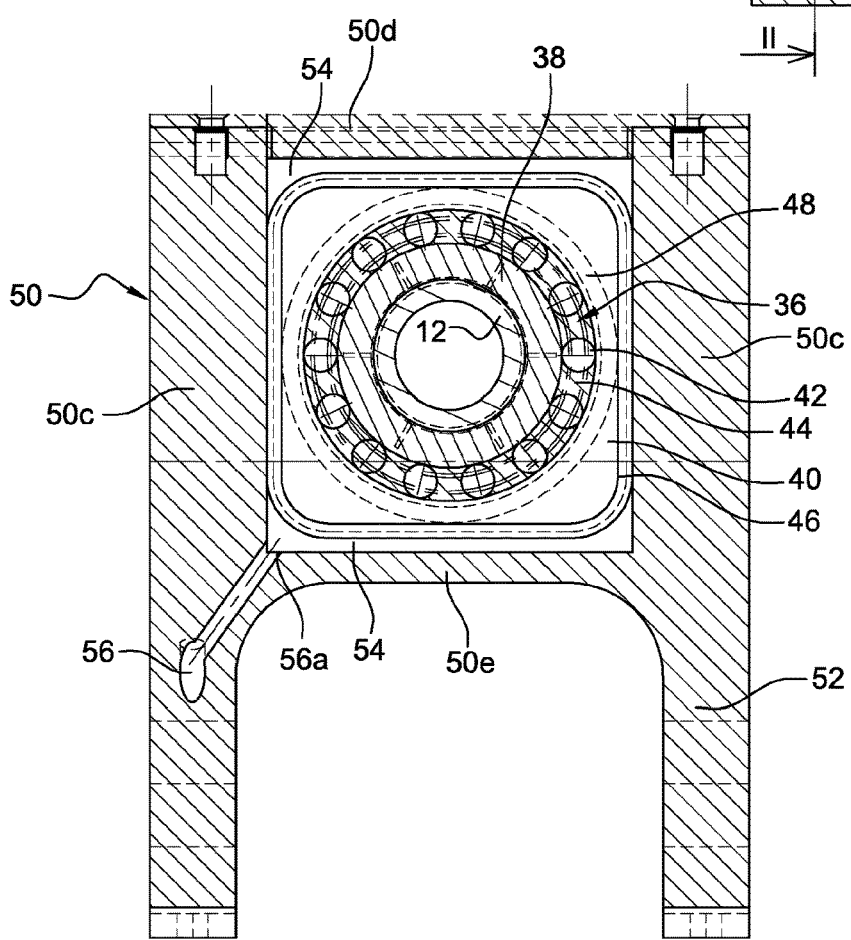
FIG. 7 is a cross section along the line II-II in FIG. 6.

FIGS. 6 and 7 show a more specific embodiment of the invention in which the elements described above are denoted by the same reference numerals.

In this case, the antifriction bearing 36 is of the ball bearing type and comprises two races, inner 38 and outer 40, respectively, between which a row of balls 42 extends, which balls are held by an annular cage 44. The inner race is rigidly mounted on one end of the shaft 18 of the input line 12, remote from the end thereof comprising the swivelable splines 30.

The shape of the outer race 40 is specific to the invention. Said race has an annular inner periphery that defines a ball raceway 42, and a generally square or rectangular outer periphery. The outer race 40 comprises an annular groove 46 on the outer periphery thereof that extends radially towards the outside with respect to the axis B of the input line.

The outer race 40 further comprises an annular groove on the front face thereof for accommodating a first annular seal 48, and an annular groove on the rear face thereof for accommodating a second annular seal 48. The seals 48 are similar and coaxial.

The outer race 40 is mounted so as to be slidable in the radial direction, with respect to the axis B, in a recess of a slide 50 that is carried by a support element 52 of the shaft 18 of the input line. This support element 52 can be fixed directly to the housing of the reduction gear, which housing is not shown here.

The slide 50 has a generally parallelepipedic shape and comprises a front wall 50a, a rear wall 50b, two lateral walls 50c, an upper wall 50d and a lower wall 50e, said walls 50a-50e defining therebetween the above-mentioned recess in which the outer race 40 of the bearing 36 is accommodated.

As can be seen in the drawings, the lateral edges of the outer race 40 cooperate in a sliding manner with the lateral walls 50c of the slide. The front and rear faces of the outer race 40 also cooperate in a sliding manner with the front 50a and rear 50b walls of the slide, the seals 48 providing sealing, in particular in the radial direction, between the race 40 and the walls 50a, 50b thereof.

In the balanced position shown in the drawings, the outer race 40 is located substantially in the centre of the recess in the vertical direction, which is the direction that is substantially perpendicular to a plane (generally horizontal) passing substantially through axes C of the intermediate lines 16. In this position, the outer race 40 defines an upper oil-filled cavity 54 together with the upper wall 50d and a lower oil-filled cavity 54 together with the lower wall 50e. These cavities 54 are in communication with one another via the peripheral groove 46 of the race 40.

The cavities 54 and the peripheral groove 46 form a chamber for oil for damping radial, and in particular vertical, movements of the shaft 18 of the input line 12. The oil is conveyed into this chamber by an oil pipe 56 which, in this case, is formed in the support element 52 and the slide 50. This pipe 56 has an end 56a that extends into the chamber, and an opposite end that is connected to suitable oil supply means.

The chamber can be supplied with oil at a specified pressure in order to ensure the damping of the above-mentioned movements. In a variant, the chamber may not be supplied with oil (via the pipe 56) but may simply contain oil at a specified pressure. The pressure of the oil is approximately 1 bar, for example.

The invention also makes it possible to use the oil in order to lubricate the slide 50 and thus reduce the risk of seizure of the sliding connection between the outer race 40 and the slide.

Figure 3:
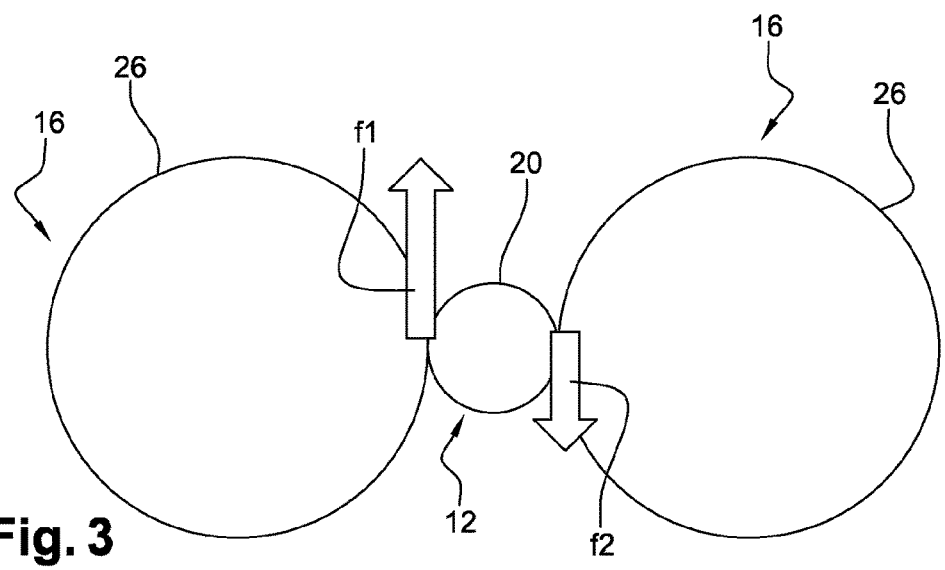
FIGS. 3 and 4 are schematic partial front views of a reduction gear of the type mentioned above, FIG. 3 showing a non-uniform distribution of loads between the intermediate lines, and FIG. 4 showing a uniform distribution of loads between the intermediate lines.
Figure 4:
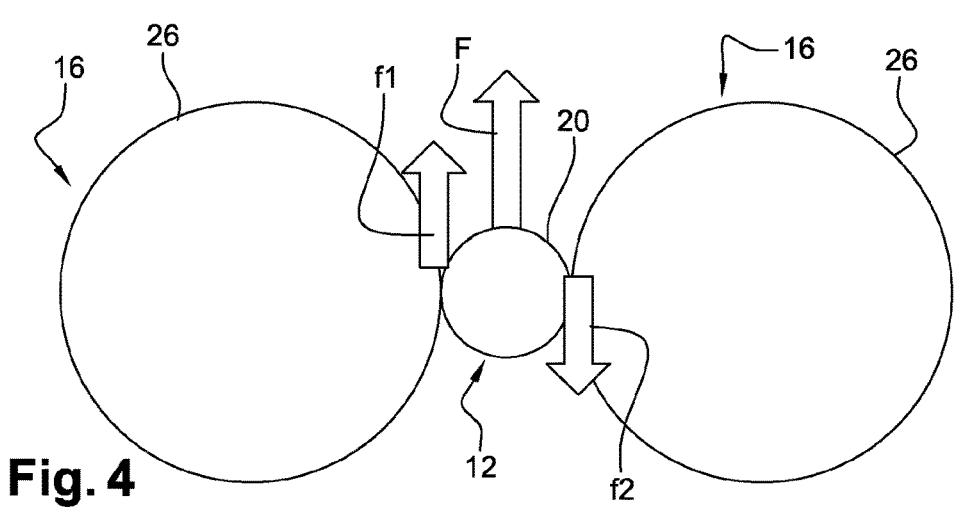
Figure 5:
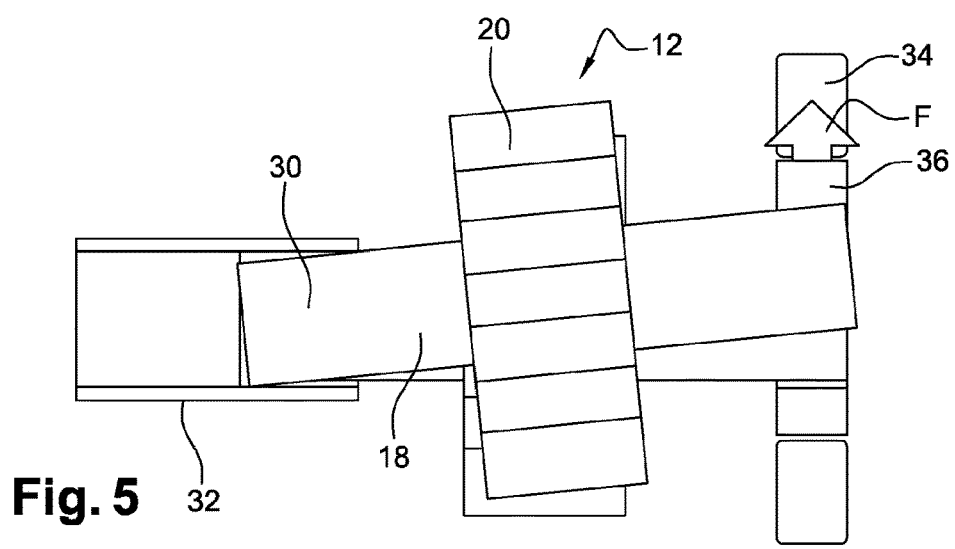
FIG. 5 is a very schematic view of an input line provided with load distribution means according to the invention.

The invention functions as set out above in relation to FIGS. 3 and 4.

Using an oil chamber as a damping means has the following advantages: increase in reliability (low risk of seizure of the slide, low risk of dynamic excitation, etc.), improved design, saving in mass (perfect balance, no need to oversize the gears of the intermediate lines in order to take account of a load imbalance, etc.), cost saving, etc.

The invention claimed is:

1. Speed reduction gear comprising two intermediate transmission lines, comprising an input line and an output line that is driven by the input line via said intermediate transmission lines, said intermediate transmission lines being substantially parallel, wherein said reduction gear comprises means for distributing loads between said intermediate lines, said load distribution means comprising swivelling coupling means for rotatably coupling one end of the input line, and oil-damping means for damping radial movements of an opposite end of the input line.

2. Reduction gear according to claim 1, wherein the damping means are designed to allow the input line to move in a direction substantially perpendicular to a plane passing substantially through axes of the intermediate lines.

3. Reduction gear according to claim 1, wherein the input line is rotated by an antifriction bearing, said bearing comprising an outer race that is mounted so as to be radially slidable in a slide and that defines a damping oil chamber together with walls of said slide.

4. Reduction gear according to claim 3, wherein said race has an annular inner periphery that defines a raceway, and a generally square or rectangular outer periphery, the parallel and opposing lateral edges of which cooperate in a sliding manner with the lateral walls of the slide.

5. Reduction gear according to claim 4, wherein said oil chamber comprises an upper oil cavity delimited between the outer race and an upper wall of the slide, and a lower oil cavity delimited between the outer race and a lower wall of the slide.

6. Reduction gear according to claim 5, wherein the outer race comprises an outer peripheral groove that provides fluid communication between said upper and lower cavities.

7. Reduction gear according to claim 3, wherein the outer race has a front annular seal and a rear annular seal which cooperate with front and rear walls, respectively, of said slide.

8. Reduction gear according to claim 3, wherein the slide is fixed to a housing of the reduction gear.

9. Reduction gear according to claim 1, wherein the swivelling means and the damping means are mounted on either side of a gear of the input line.

10. Turbine engine, which comprises at least one reduction gear according to claim 1.

* * * * *